United States Patent [19]

Takizawa et al.

[11] Patent Number: 5,758,043

[45] Date of Patent: May 26, 1998

[54] IMAGE PROCESSING METHOD AND APPARATUS

[75] Inventors: Masashi Takizawa; Katsumi Masaki; Masayuki Takayama; Hiroshi Netsu; Makoto Nihei, all of Yokohama; Koji Kawamura, Kawasaki, all of Japan

[73] Assignee: Canon Kabushiki Kaisha, Tokyo, Japan

[21] Appl. No.: 523,337

[22] Filed: Sep. 5, 1995

[30] Foreign Application Priority Data

Sep. 5, 1994 [JP] Japan .................................. 6-211165

[51] Int. Cl.⁶ .................................................. H04N 1/41
[52] U.S. Cl. ............................ 395/115; 358/300; 358/401
[58] Field of Search ................................ 395/101, 102, 395/109, 115, 116, 117, 501; 358/261.4, 300, 302, 401

[56] References Cited

U.S. PATENT DOCUMENTS

| | | | |
|---|---|---|---|
| 5,086,346 | 2/1992 | Fujisawa | 358/453 |
| 5,134,572 | 7/1992 | Takasaki et al. | 364/514 A |
| 5,315,404 | 5/1994 | Kuboki et al. | 358/433 |
| 5,444,550 | 8/1995 | Enokida et al. | 358/453 |

*Primary Examiner*—Raymond J. Bayerl
*Assistant Examiner*—U. Chauhan
*Attorney, Agent, or Firm*—Fitzpatrick, Cella, Harper & Scinto

[57] ABSTRACT

An image processing method and apparatus which divides image information into a plurality of predetermined-sized partial images, and sequentially performs designated image processing by partial image, thus enables image processing of the read image data using a small memory capacity. In the apparatus, an image reader reads image information, in accordance with a designated reading size, and stores the read image data, as partial image data, into an image memory. Then, a designated special-effect image processing is performed on the partial image data stored in the image memory. An image output unit sequentially outputs special-effect image processed partial images.

23 Claims, 12 Drawing Sheets

IMAGE PROCESSING METHOD AND APPARATUS

BACKGROUND OF THE INVENTION

This invention relates to an image processing method and apparatus and, more particularly to an image processing method and apparatus for special-effect image processing on image information read by using a scanner or the like.

In an image processing apparatus that performs special-effect image processing such as mosaic processing and fogging (soft-focusing) on images optically read by using a scanner or the like, once image reading is started, the scanning is continued to the end of the image. All the read image information is stored into a memory or a storage device, then a designated special-effect image processing is performed.

However, such image processing apparatus, in which all the image information read to the end of the image must be stored, requires a large capacity memory or storage device. Further, the apparatus requires another large capacity memory or storage device to store image processed by the designated special-effect image processing. For this reason, the apparatus must have a considerably large capacity memory or storage device, and the apparatus is expensive.

SUMMARY OF THE INVENTION

The present invention has been made in consideration of the above problem, and has its object to provide an image processing method and apparatus that divides image information into predetermined-sized partial images and sequentially processing them by a designated special-effect image processing on each partial image, thus enables an image processing apparatus for read image information with a small memory capacity.

Another object of the present invention is to provide an image processing method and apparatus which sets the size of partial image information, thus enables efficient use of memory in accordance with its available memory capacity.

Further object of the present invention is to provide an image processing method and apparatus which automatically determines an appropriate partial-image size based on the memory status, thus easily and reliably realizes efficient use of memory.

According to the present invention, the above objects are attained by providing an image processing apparatus comprising: storage means for storing partial image data, obtained from an original image, having a predetermined size; processing means for performing predetermined image processing on the partial image data stored in the storage means; and output means for outputting the partial image data processed by the processing means.

In this manner, the memory capacity of the storage means may be only for processing the predetermined sized partial image. For this reason, the image processing can be performing with a small memory capacity.

Preferably, the image processing apparatus further comprising reading means for optically reading the original image and obtaining the partial image data having the predetermined size. In this construction, a partial image is extracted in the device that optically reads an image (e.g., scanner).

Preferably, in the image processing apparatus, the storage means sequentially inputs image data obtained by optically reading the original image, extracts the partial image data having the predetermined size, and stores the extracted partial image data. In this construction, partial image data is extracted from optically-read image data. Since the extraction of partial image is made on the image processing apparatus side, the apparatus is connectable with a reading device such as a scanner.

Preferably, in the image processing apparatus, the setting means detects the memory capacity available for storing the image data, and automatically sets the predetermined size based on the detected memory capacity. In this construction, a memory capacity for storing partial image data is automatically determined based on the status of the memory attached to the apparatus, and the size of partial image is set based on the determined memory capacity. Accordingly, an appropriate partial image size is automatically set in accordance with memory use status, thus the efficiency of memory use and operability are improved.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

[First Embodiment]

Figure 1:
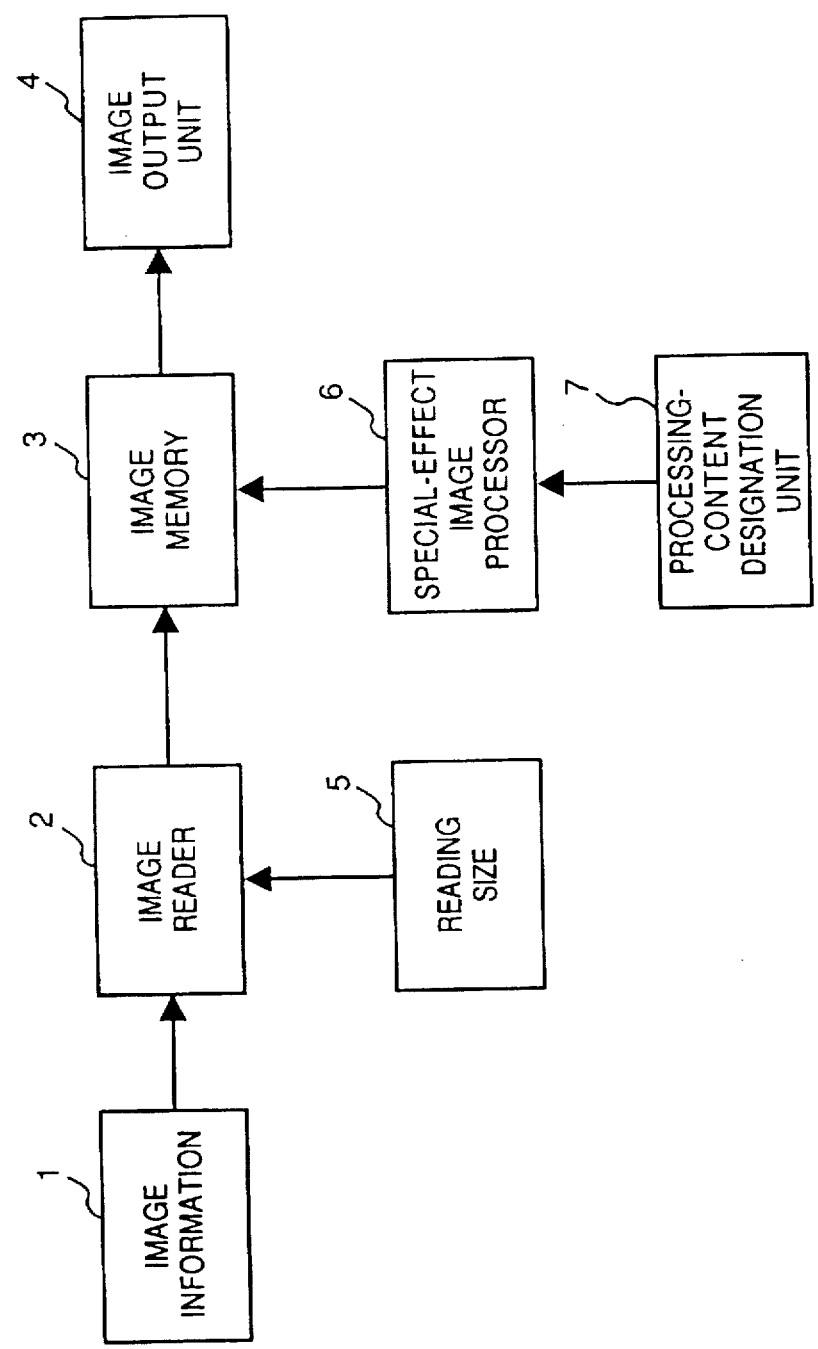
FIG. 1 is a block diagram showing the outline of processing in an image processing apparatus according to a first embodiment of the present invention.

FIG. 1 shows the outline of processing by an image processing apparatus according to a first embodiment of the present invention. In FIG. 1, reference numeral 1 denotes image information contained in an original image; 2, an image reader which reads the image information 1. At this time, the image reader 2 reads the image information in accordance with the designated reading size 5 as a partial image. Numeral 3 denotes an image memory in which the partial image information read by the image reader 2 is stored. The image memory 3 comprises a RAM, a magnetic disk or the like.

Numeral 6 denotes a special-effect image processor which performs special-effect image processing designated by a processing-content designation unit 7, on the partial image stored in the image memory 3. The special-effect image processing includes, masking, enlargement and/or reduction (hereinafter referred to as "enlargement/reduction"), mosaic processing, artistic-touch processing, optical-filter processing, fogging (soft-focus processing), edge enhancing, texture processing such as ripple-adding processing, twist processing etc. Numeral 4 denotes an image output unit which sequentially outputs special-effect processed partial images.

Figure 2:
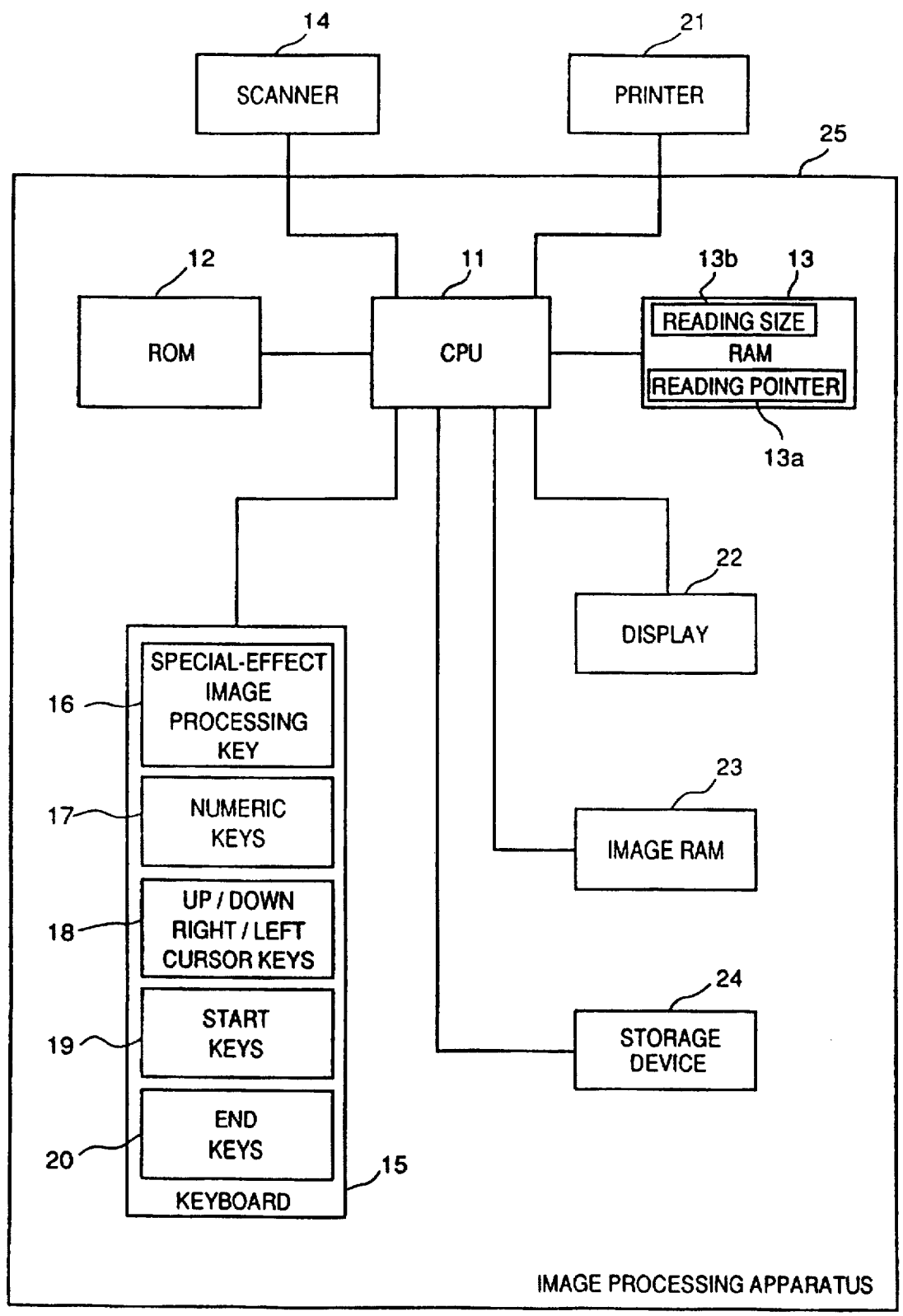
FIG. 2 is a block diagram showing the configuration of the image processing apparatus of the first embodiment.

FIG. 2 shows the configuration of the image processing apparatus of the first embodiment. In FIG. 2, numeral 25 denotes the overall apparatus. Numeral 11 denotes a CPU which performs various controls of the image processing apparatus 25; 12, a ROM in which various control programs executed by the CPU 11 and a processing program for realizing an image processing method to be described later are stored; 13, a RAM which provides work area upon execution of the various programs by the CPU 11, as an auxiliary memory.

Numeral 14 denotes a scanner which optically reads image information from an original. The scanner 14 performs reading of an original image based on the reading position and the reading size designated by the CPU 11. That is, the scanner 14 obtains image information for the designated reading size, from the designated reading, position of the original image. Note that the CPU 11 uses a reading pointer 13a (to be described later) stored in the RAM 13, to obtain the reading position and uses a reading size 13b also stored in the RAM 13 to obtain the reading size. Numeral 15 denotes a keyboard having a special-effect processing key 16 for switching processing to set the content of special-effect processing, numeric keys 17 for key-inputting an image reading size for reading by the scanner or designating the type of special-effect image processing, up/down/right/left cursor keys 18 for moving a cursor upward, downward, rightward and leftward, a start key 19 for instructing the start of special-effect image processing, and an end key 20 for terminating the special-effect image processing.

Numeral 21 denotes a printer which sequentially outputs special-effect image processed partial images; 22, a display which displays a menu of setting contents of special-effect image processing; 23, an image RAM; and 24, a storage device. The image RAM 23 and the storage device 24, respectively for storing partial image data read by the scanner 14 and image-processed image data, form the image memory 3.

Figure 3:
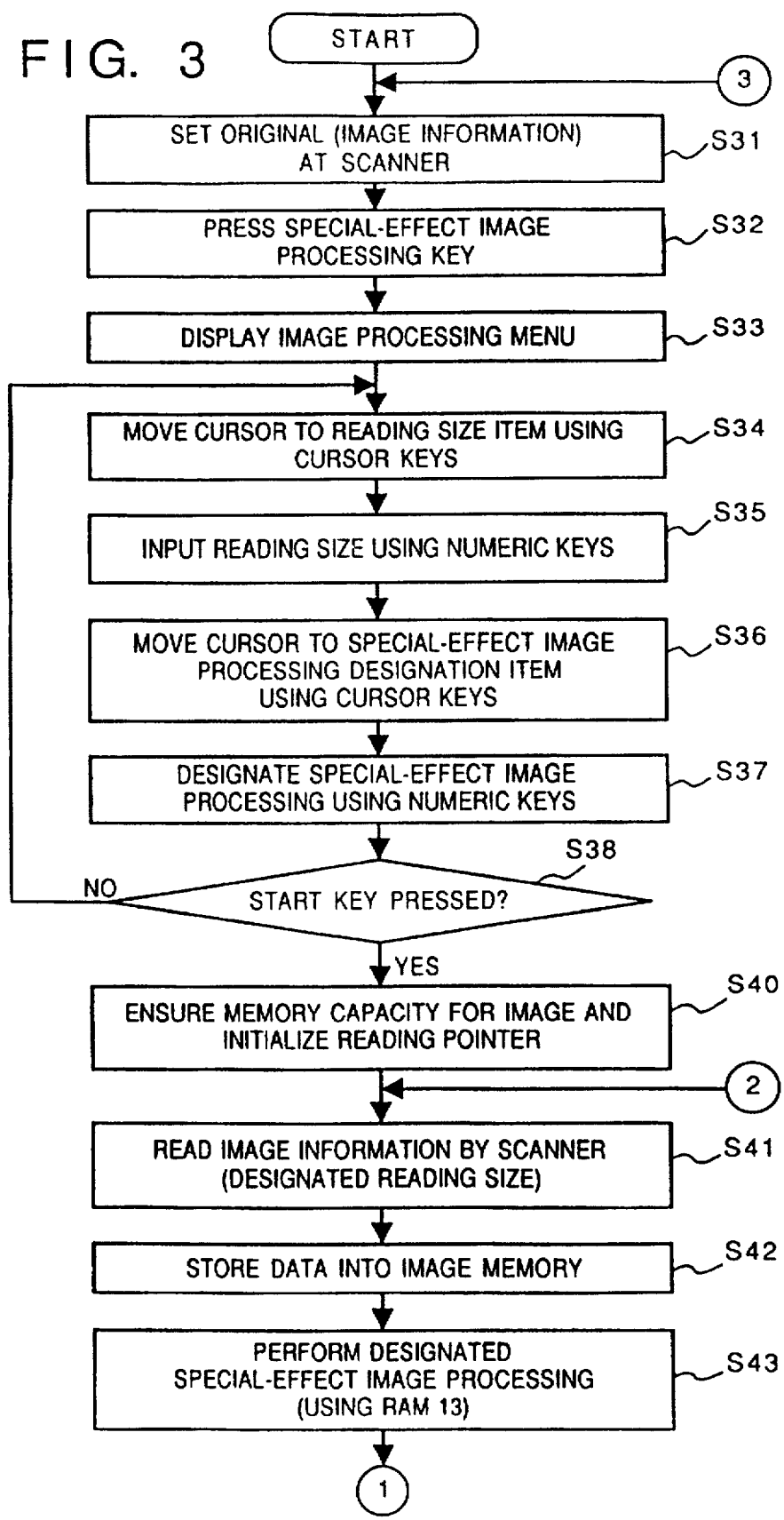
FIGS. 3 and 4 are flowcharts showing a processing procedure of the first embodiment.
Figure 4:
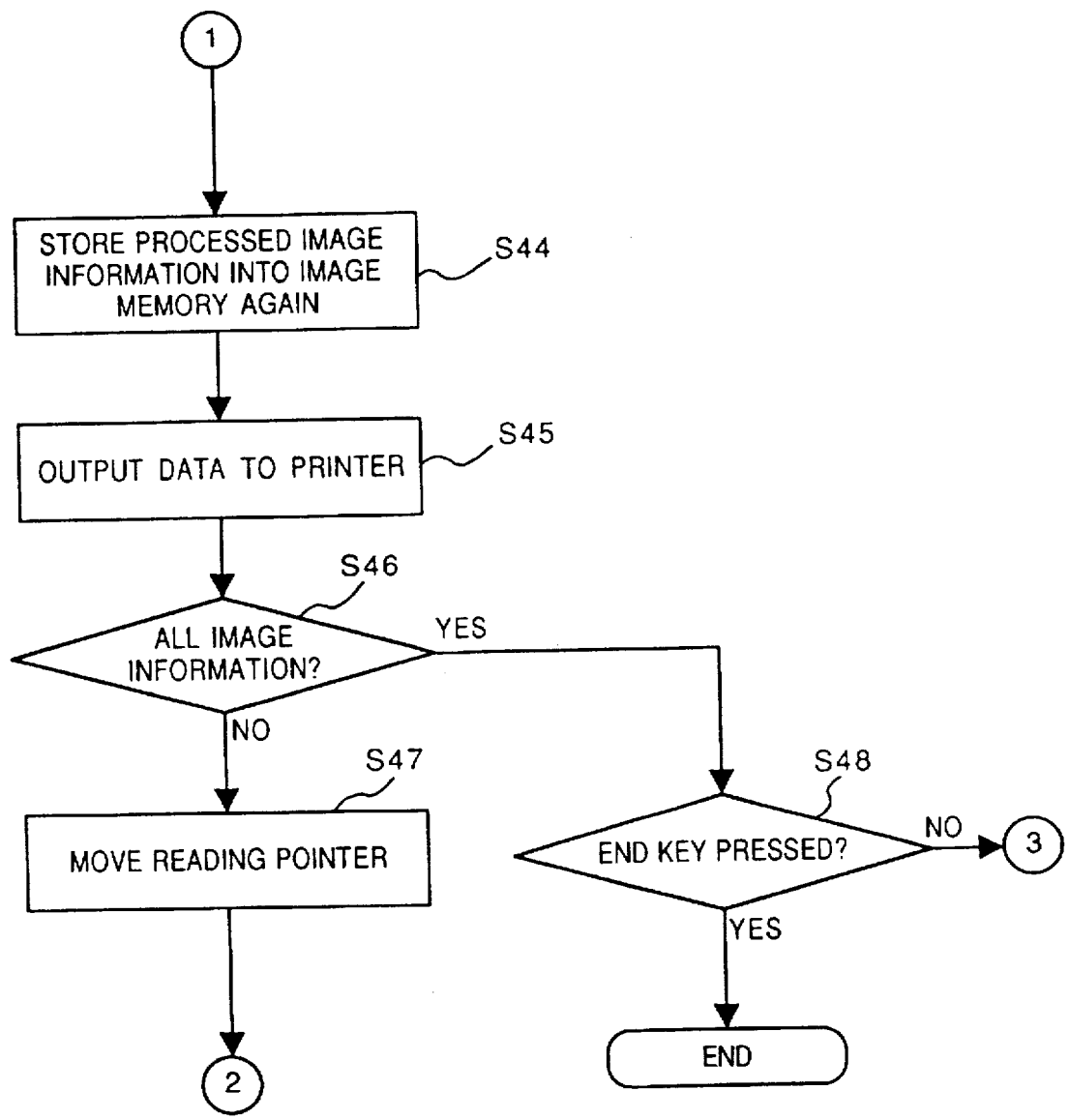

Next, the operation of the image processing apparatus 25 of the first embodiment having the above construction will be described below with reference to the flowcharts of FIGS. 3 and 4 showing a processing procedure according to the first embodiment.

At step S31, an original is set on the scanner 14. Next, at step S32, the special-effect image processing key 16 is pressed for setting special-effect image processing and a partial image size etc., then the process proceeds to step S33, at which an image processing menu as shown in FIG. 5 is displayed on the display 22.

Figure 5:
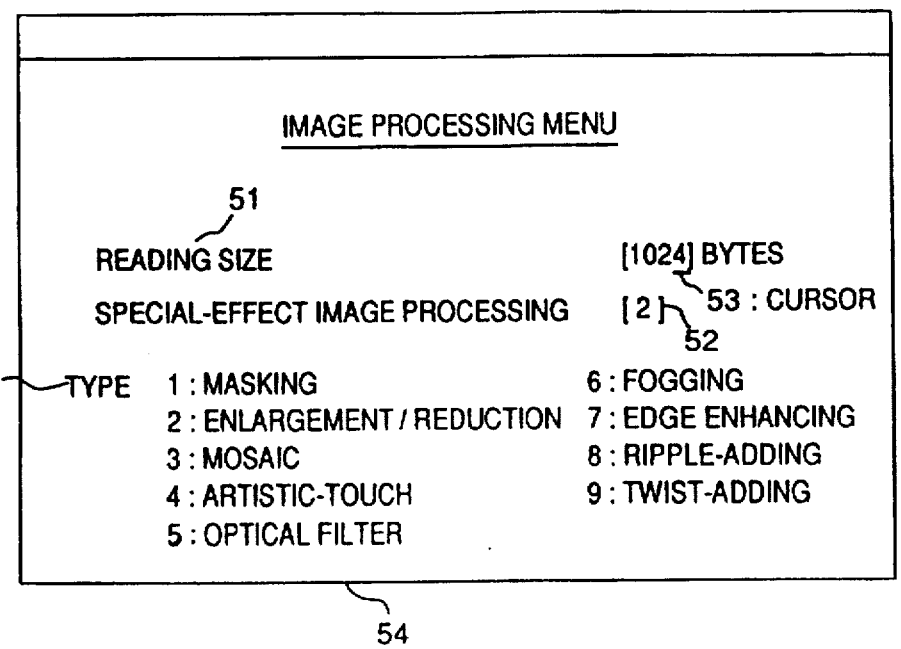
FIG. 5 illustrates a display image of an image processing menu according to the first embodiment.

FIG. 5 shows a display status of the image processing menu. In FIG. 5, numeral 54 denotes the entire image processing menu. As described above, when the special-effect image processing key 16 is pressed, the menu 54 is displayed on the display 22. A "scanner reading size" item 51 is used for inputting the size of image information (e.g. the number of lines) of one partial image read at one reading by the scanner 14. The reading-size input is made by using the numeric keys 17. The set content is stored as the reading size 13b. A "special-effect image processing designation" item 52 is used for designating special-effect image processing. The designation is made by selecting one of the desired processing types 55 and inputting the number of the selected processing with the numeric keys 17.

For the reading size input and processing designation, with the numeric keys 17, the up/down/right/left cursor keys 18 are used to move the cursor 53 to a target item. The types 55 show the types of special-effect image processings. For example, "1" indicates masking (masking image information except a specific-ranged image information as effective information); "2", enlargement/reduction (enlarging or reducing image information), "3", mosaic processing (dividing image into blocks and making block groups each at the same gray scale level or of the same color data value); "4", artistic-touch processing (processing to produce artistic painting touch (expression of touch of paint brush, the number of colors appropriate to oil painting, expression of painted canvas etc.)); "5", optical-filter processing (processing to produce optical-filtered (rainbow, crosslights, square, halo etc.) image); "6", fogging (soft-focus) processing (processing to render an image softened by averaging pixel values or reducing contrast difference); "7", edge enhancement (processing to sharpen a focal point or emphasizing contrast or edges); "8", ripple-adding processing (processing to produce effect which seems like ripples occur when wind blows over water surface); and "9", twist processing (processing to deform an image by providing spiral twist with the center as its axis).

Returning to FIG. 3, at steps S34 to S38, various settings are made by using the above image processing menu. First, at step S34, the up/down/right/left cursor keys 18 are used to move the cursor 53 to the reading size item 51. At step S35, the numeric keys 17 are used to input a reading size for the scanner 14 into the item 51.

Next, at step S36, the up/down/right/left cursor keys 18 are used to move the cursor 53 to the special-effect image processing designation item 52. The designation is made by selecting one of the types 55 (in this example, 1: masking, 2: enlarge and/or reduction, 3: mosaic processing; 4; artistic-touch processing, 5: optical filter processing, 6; fogging (soft-focus) processing, 7: edge enhancing, 8: ripple-adding processing and 9: twist processing), and the number of selected type is inputted using the numeric keys 17.

At step S38, if the start key 19 is not pressed, it is determined that the set contents are to be changed further, the process returns to step S34 to repeat the procedure to step S37. On the other hand, if the start key 19 for starting the designated special-effect image processing is pressed, it is determined that the set contents are not changed. Then the process advances through steps S38 to step S40.

At step S40, to store image information read by the scanner 14, a memory capacity for the reading size of the scanner, designated at step S35, is ensured in the image memory 3 (the image RAM 23 or storage device 24). Further, the reading pointer 13a indicative of the reading start position on an original is initialized.

At step S41, reading of image information is made by the scanner 14. The scanner 14 starts reading from the position indicated by the reading pointer 13a. The image size at this time is the reading size of the scanner, designated at step S35. At step S42, the image information read at step S41 is stored into the storage area in the image memory 3, ensured at step S40. At step S43, the special-effect image processing designated at step S37 is performed. Note that upon execution of the special-effect image processing, the RAM 13 is used as an auxiliary storage.

As the special-effect image processing designated at step S37 is completed, then at step S44, the processed image information is stored into the storage area ensured at step S40. At step S45, the processed partial image is outputted to the printer 21. At step S46, if the processing of the entire image information has not been completed, the process proceeds to step S47, at which the reading pointer 13a is moved by the reading size designated at step S35. Then the pointer 13a indicates a start point of next image block to be read. Note that the determination of the completion of the processing of the entire image information can be made based on a predetermined original image size and the size of processed partial image and the number of the processed partial images.

Thereafter, the process returns to step S41, at which the scanner 14 performs image reading from a position indicated by the moved reading pointer 13a. Then, the processing to step S45 is performed on a newly-read partial image, and the processed partial image is outputted to the printer 21.

At step S46, if the processing of the entire image information has been completed, then process proceeds to step S48. At step S48, if the end key 20 has not been pressed, the process returns to step S31 to repeat the above processing and the special-effect image processing is continued. On the other hand, if the end key 20 was pressed, the special-effect image processing is terminated.

Figure 6:
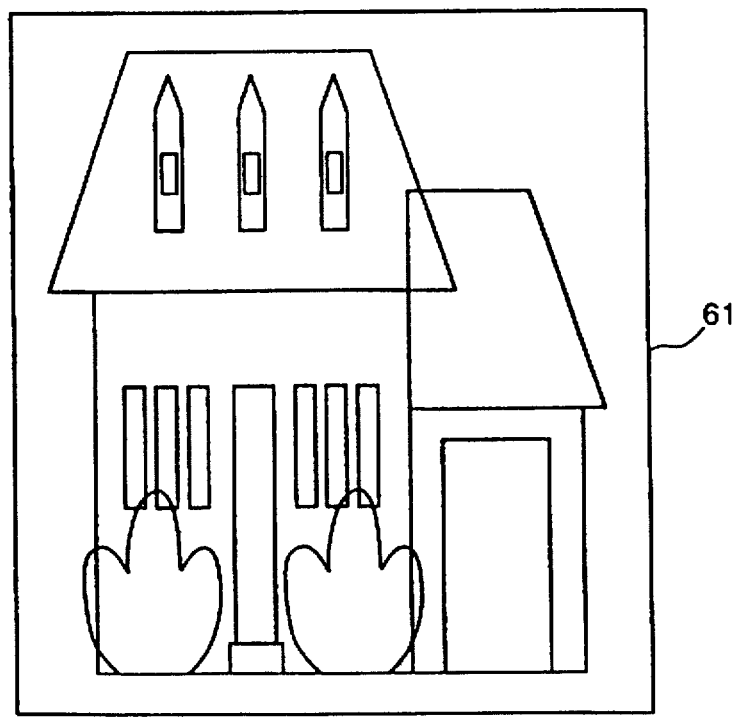
FIG. 6 illustrates an example of an original to be set at a scanner.

FIG. 6 shows an example of an original to be set at the scanner 14. Numeral 61 denotes the status of image information. At step S31, such original is set at the scanner 14, necessary settings are made with the image processing menu 54, and the start key 19 is pressed, then a partial image as shown in FIG. 7 is read.

Figure 7:
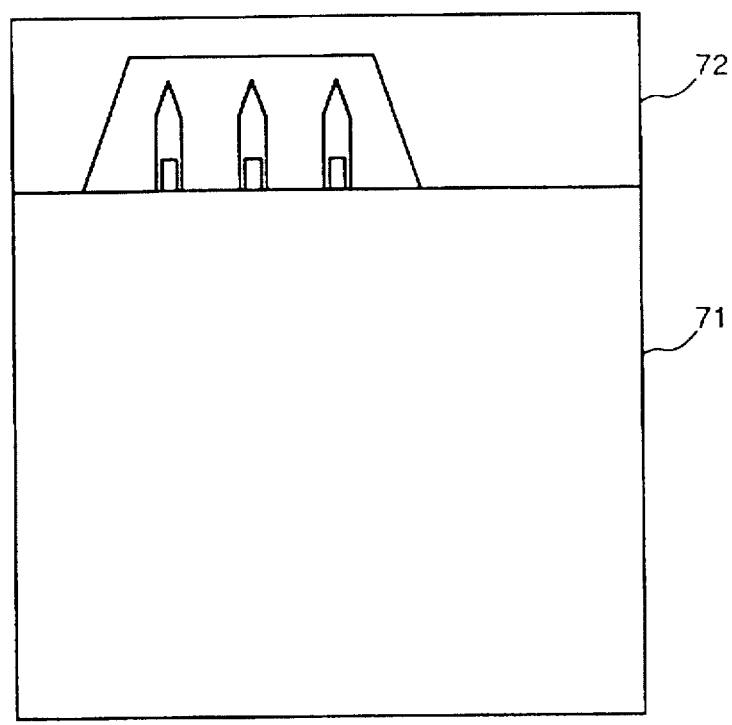
FIG. 7 illustrates image information read at a first scanning operation.

FIG. 7 shows a partial image read by the scanner 14 at one reading operation. Image information read by the scanner 14 at one scanning operation. In FIG. 7, numeral 71 denotes the size of the entire image information. Numeral 72 denotes a partial image read by the scanner 14, the size of which is set with the image processing menu 54.

Figure 8:
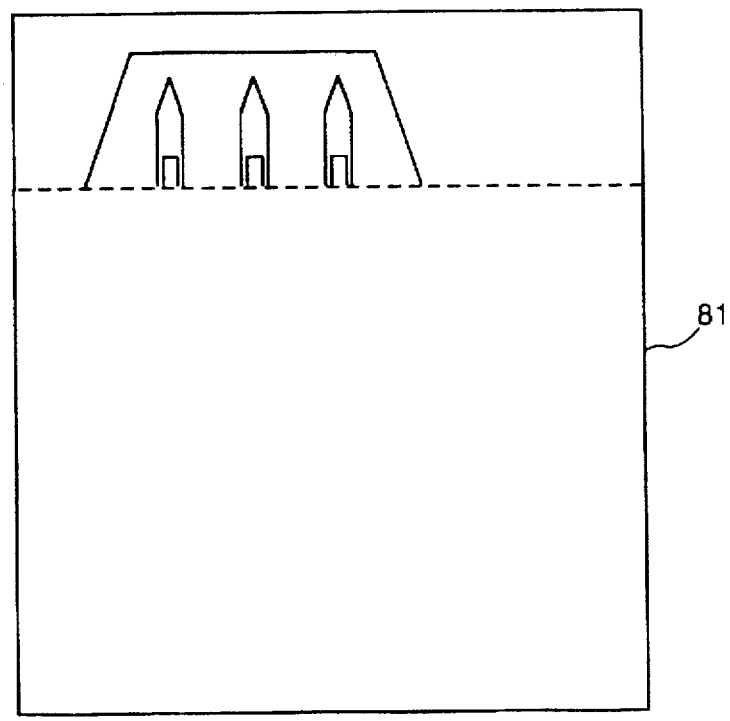
FIG. 8 illustrates a partial image outputted from a printer at a first output operation.

FIG. 8 shows a partial image outputted from the printer 21. In FIG. 8, numeral 81 denotes the status of image information outputted by the printer 21 based on the image information read by the scanner 14 at the first scanning.

Figure 9:
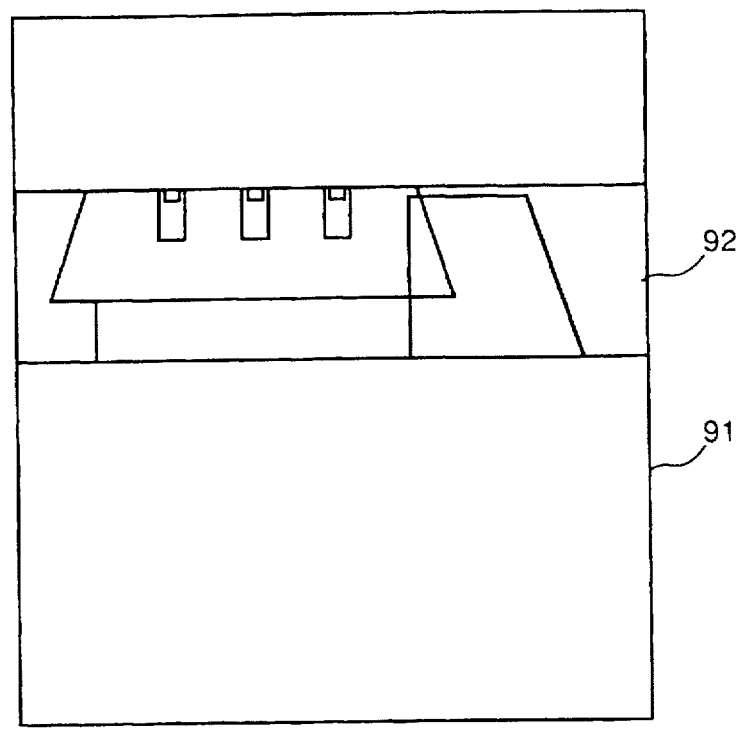
FIG. 9 illustrates image information read at a second scanning operation.

FIG. 9 shows a partial image read by the scanner 14 at a second scanning operation. The reading pointer is moved to the next line after the final line of the image 72 in FIG. 7, and reading is performed, thus a partial image 92 is obtained. Note that the portion 71 in FIG. 7, the portion 91 denotes the remaining portions of the entire image information.

Figure 10:
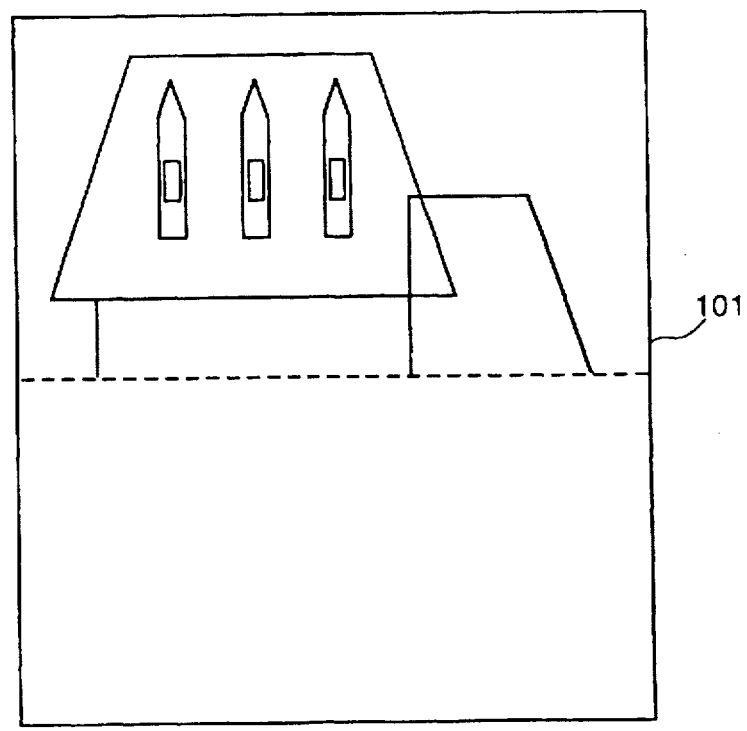
FIG. 10 illustrates a partial image outputted from the printer at a second output operation.

FIG. 10 shows image information outputted by the printer 21 after the second printing operation. The printing is made at a position following the partial image (image 81 in FIG. 8) recorded by the first output operation. If the printer 21 is, e.g., a line printer, recording can be stopped every time printing of each partial image has been completed.

Accordingly, a line printer is suitable as the printer 21 connected to the image processing apparatus.

As described above, according to the first embodiment, an original is read by the scanner 14 in partial image units, and special-effect image processing is performed on each partial image, and processed partial images are outputted, one partial image at one printing, sequentially. This construction requires an image memory having capacity necessary for image processing in accordance with the size of partial image, therefore, necessary memory capacity can be reduced.

In the first embodiment, the image memory 3 has a dedicated RAM 23. However, a partial-image size (reading size for the scanner) can be set in accordance with the memory use status, therefore, the RAM 23 is not necessarily dedicated to the image memory-3.

Note that in the first embodiment, a partial image is extracted by moving the reading pointer of the scanner, however, the extraction is not limited to this method. For example, the scanner may repeatedly input the whole image data, and each partial image may be extracted while storing data into the image memory 3. This can be realized by counting the number of lines of image data inputted from the scanner, and selecting the lines to be stored based on the count value. For example, if a partial image has 100 lines, 1–100 lines may be stored at the first reading and 101–200 lines may be stored at the second reading.

Figure 14:
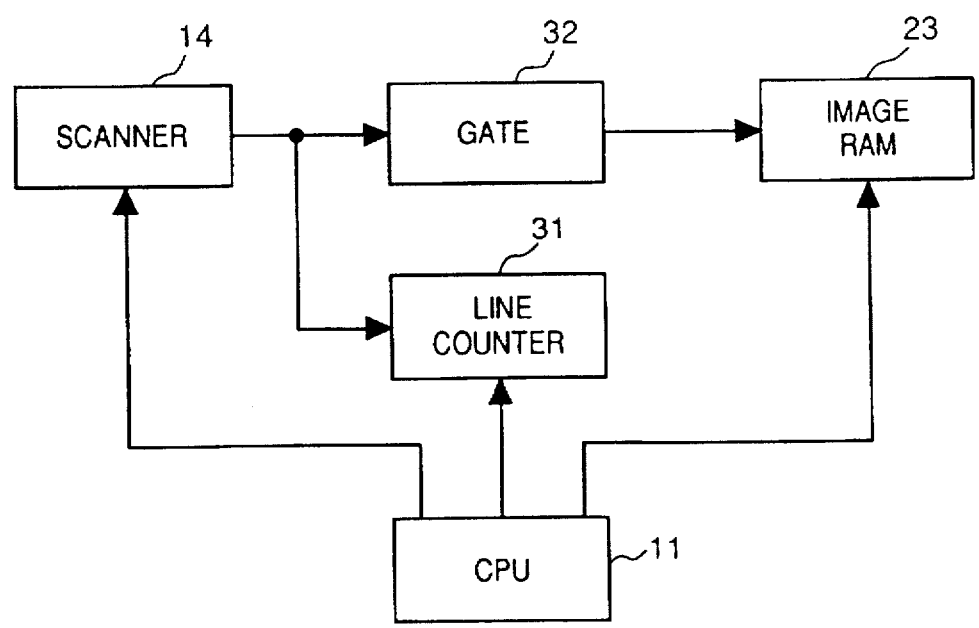
FIG. 14 is a block diagram showing the construction for extracting a partial image from image data obtained from a scanner.

This control can be realized by a construction as shown in FIG. 14 which only shows the necessary components in addition to those in FIG. 2. In FIG. 14, the scanner 14 reads the entire image from the original image in accordance with a reading instruction from the CPU 11, and outputs image data. Numeral 31 denotes a line counter which counts the number of lines of the image data inputted from the scanner 14. The line counter 31 compares the start and end line numbers of the input image data with the number of the current line of the image data. If the current line of the input image data is between the start line and the end line numbers, the line counter 31 outputs a passing signal indicative of passing of input data, to a gate 32. The gate 32 passes the image data from the scanner 14 for a period in which the passing signal is inputted from the line counter 31 and outputs the image data to the image RAM 23. Note that the start line and the end line numbers are updated by the CPU 11 in the progress of the processing.

Figure 17:
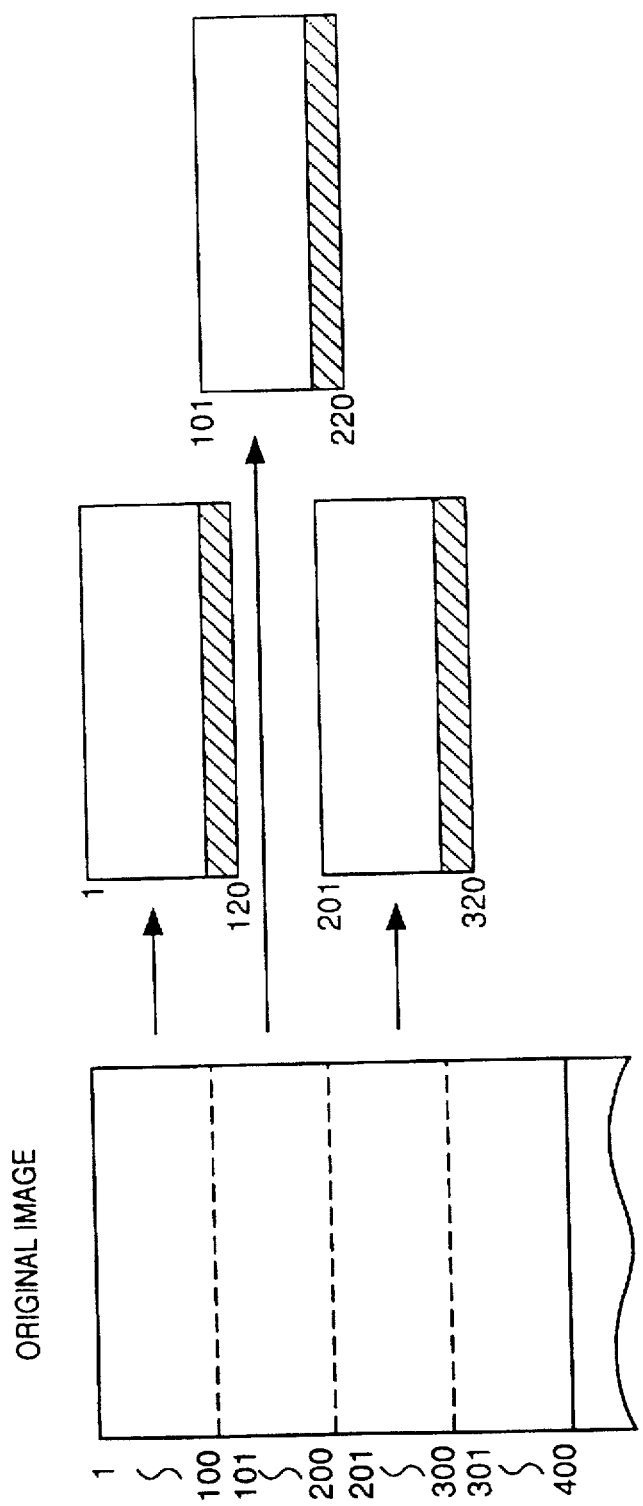
FIG. 17 illustrates a partial image having an overlapped portion.

In the above construction as shown in FIG. 17, it is possible to store the first to 120th lines as a partial image into the image memory 3, at the first reading, and to store 101st to 220th lines as another partial image into the image memory 3, at the second reading, so that partial images have a 20 line overlapped portion. In this case, upon outputting a partial image to the printer 21, 1 to 100 lines at the first output operation, then 101 to 200 lines at the second output operation, i.e., partial images except overlapped portion are outputted. In this manner, as a partial image has an overlapped portion, which is used for image processing , various special-effect image processings can be performed.

[Second Embodiment]

Next, a second embodiment of the present invention will be described below. In this embodiment, the reading size for the scanner 14 (partial image size) is automatically set based on the available memory capacity, thus attaining simpler operation. Note that an image processing apparatus according to the second embodiment has the same construction as that of the first embodiment, therefore the explanation of the construction will be omitted. In this embodiment, the numeric keys 17 are mainly used to designate the type of special-effect image processing.

Figure 11:
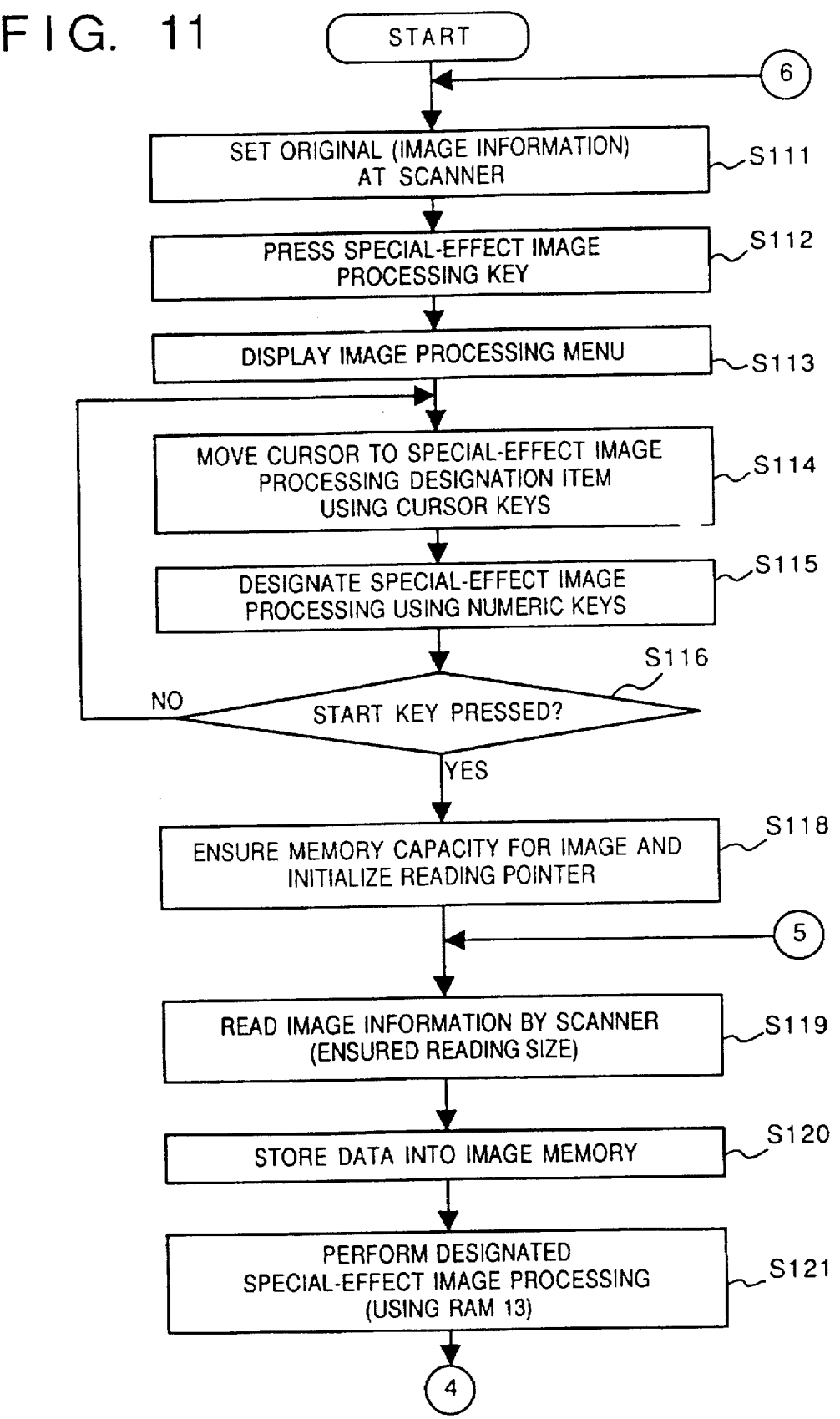
FIGS. 11 and 12 are flowcharts showing a processing procedure according to a second embodiment of the present invention.
Figure 12:
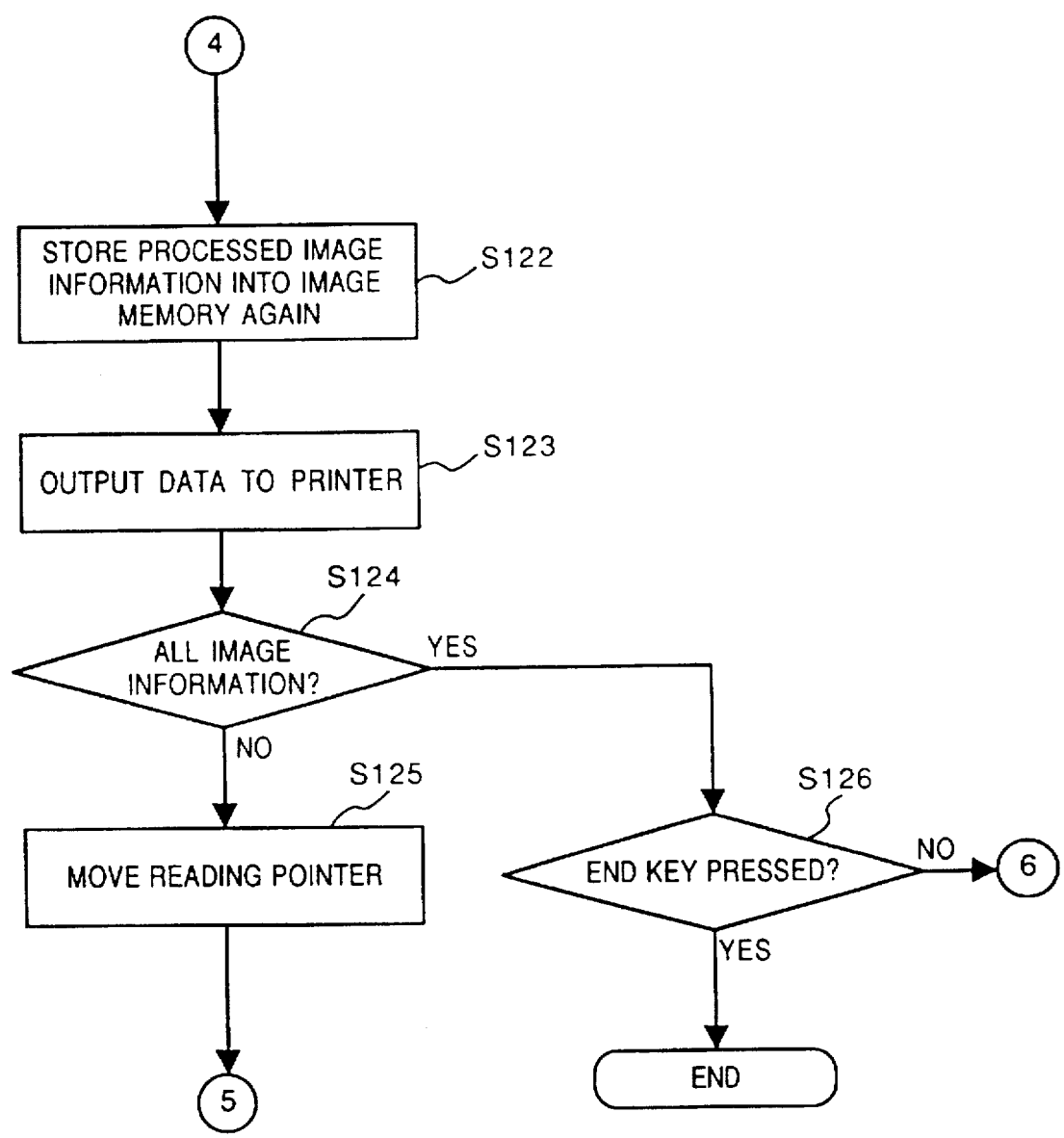

FIGS. 11 and 12 are flowcharts showing the processing procedure of the second embodiment. First, at step S111, an original (image information) is set at the scanner 14. At step S112, the special-effect image processing key 16 is pressed to instruct switching [to processing for] to special-effect image processing, and the process proceeds to step S113. At step S113, an image processing menu 134 as shown in FIG. 13 is displayed on the display 22.

Figure 13:
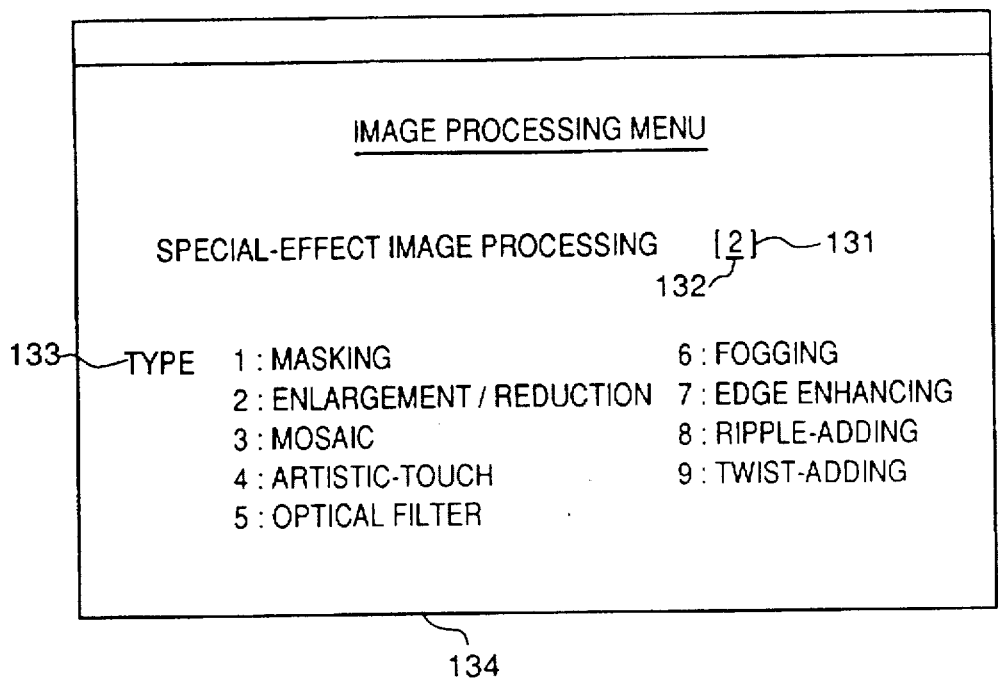
FIG. 13 illustrates a display image of an image processing menu according to the second embodiment.

FIG. 13 shows the image processing menu 134 displayed on the display 22 by pressing the special-effect image processing key 16. A special-effect image processing designation item 131 is used for designating special-effect image processing. The designation is made by selecting one of a desired processing types 133 and inputting the number of the selected processing with the numeric keys 17. For inputting the number into the item 131 with the numeric keys 17, the cursor 132 is moved by using the up/down/right/left cursor keys 18. The types 133 includes various types of special-effect image processing. As the contents of the types 133 are similar to those of the first embodiment, the explanation of the types 133 will be omitted.

At step S114, the up/down/right/left cursor keys 18 are used to move the cursor 132 to a designation portion 131. At step S115, the numeric keys 17 are used to input a number selected from the types 133 of the special-effect image processings. At step S116, if the start key 19 is not pressed, it is determined that the set contents are to be further changed further, the process returns to step S114 to repeat the processing to step S115.

If the start key 19 is pressed, it is determined that the set contents are not changed. The process advances through steps S116 to step S118. At step S118, a storage area for storing a partial image (a part of image information 61) is assigned in the image memory 3 (image RAM 23 or storage device 24) for storing image information read by the scanner 14. The capacity of the partial-image storage area assigned in the image memory 3 is obtained from calculation by the CPU 11 based on the capacity of installed memory and memory-use status. For example, the available memory capacity of the installed image RAM 23 is determined, and set this capacity is used as the size of partial image. In this case, if the image RAM is increased, the size of partial image is automatically increased.

At step S119, image information is read by the scanner 14. At this time, the size (partial-image size) of image to be read is the same as that of storage area assigned in the image memory 3 as the partial-image storage area at step S118. At step S120, the image information read at step S119 is stored into the partial-image storage area in the image memory 3 assigned at step S118. At step S121, the special-effect image processing designated at step S115 is performed. In this embodiment, the auxiliary RAM 13 is used during the processing of the special-effect image processing.

As the designated special-effect image processing is completed at step S121, the processed image information is again stored into the partial-image storage area in the image memory 3 at step S122. Then at step S123, the partial image is outputted to the printer.

At step S124, if the processing of all the image information has not been completed, the process proceeds to step S125, to move the image-information reading pointer by the size ensured as the partial-image storage area. Thereafter, the process returns to step S119 to repeat the processing to step S123.

On the other hand, if the processing of the entire image information has been completed, the process proceeds to step S126. If the end key 20 is not pressed, it is determined that the current special-effect image processing is to be continued, and the process returns from step S126 to step S111 to repeat the above processing. If the end key 20 is pressed, it is determined that the special-effect image processing is terminated, and then the process ends through step S126.

As described above, according to the second embodiment, the image processing apparatus itself automatically sets an appropriate size of partial image area. Since the apparatus always sets an appropriate reading size, memory-use efficiency and operability are improved.

As described above, according to the first and second embodiments, special-effect image processing such as masking, enlargement & reduction, mosaic processing, artistic-touch processing, optical-filter processing, fogging, edge enhancing, ripple-adding processing, twist processing and other processings can be performed with a small-capacity memory or storage device. Note that the ripple-adding processing and the twist processing are completed at each partial image.

The object of the present invention attained by the above apparatus or method can be attained by a storage medium holding the program according to the present invention since the storage medium may be attached to the apparatus and the program read out of the storage medium attains the novel function of the present invention.

In this case, the storage device 24 in FIG. 2 is provided with a storage medium such as a floppy disk or a CD-ROM and employed as a driver device which enables write therein or read therefrom. In this construction, the program, containing the control program for the controls described in the first and second embodiments, is installed into the storage device 24, the control program is read out of the storage medium, the read control program is stored into the RAM 13, and the program is executed by the CPU.

Figure 15:
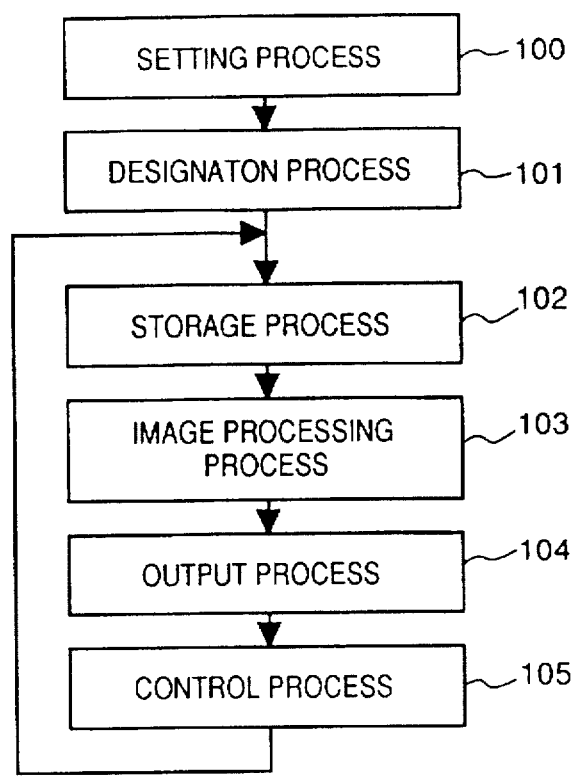
FIG. 15 is a flowchart showing a control procedure realized by executing a control program according to the present invention.
Figure 16:
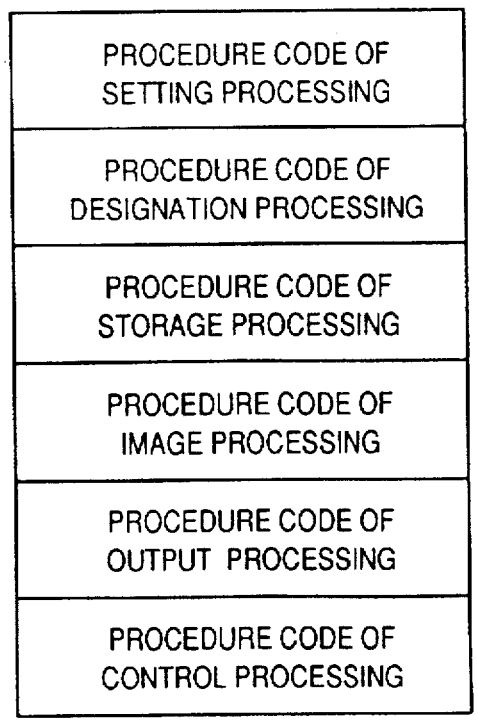
FIG. 16 is an explanatory view showing a memory map of a storage medium storing the control program.

FIGS. 15 and 16 show the structural feature of the control program according to the present invention. FIG. 15 shows the control procedure by the control program stored in the storage medium. At setting process 100, the size of image read by the scanner 14 at one reading operation (i.e., partial image size) is set, and a necessary storage area is ensured in the image memory 3. the setting process 100 corresponds to steps S32 to S35 in FIG. 3. At designation process 101, the type of special-effect image processing is designated. The designation process 101 corresponds to steps S36 and S37 in FIG. 3.

At storage process 102, an original is read by the scanner 14 and a partial image of a set size is stored into the image memory 3. The storage process 102 corresponds to steps S41 and S42 in FIG. 3. At image-processing process 103, the special-effect image processing designated at the designation process S101 is performed on the partial image stored in the image memory 3 at the storage process 102. The image-processing process 102 corresponds to step S43 in FIG. 3 and step S44 in FIG. 4. At output process 104, the special-effect image processed partial image stored in the image memory 3 is outputted to the printer 21. The output process 104 corresponds to step S45 in FIG. 4.

At control process 105, the storage process 102, the image-processing process 103 and the output process 104 are repeated so that the designated special-effect image processing is performed with respect to the entire image. The control process 105 corresponds to steps S46 to S49 in FIG. 4.

In the above control procedure, if a partial-image size is automatically set at the setting process 100 and the order of the setting process 100 and the designation step 101 are reversed, the procedure in FIG. 15 can be used for the processing procedure in FIGS. 11 and 12.

FIG. 16 shows a memory map of a storage medium 200 installed into the storage device 24. Procedure codes to realize the respective process in FIG. 15 are stored in the storage medium 200 as shown in FIG. 16. The storage medium may be any storage medium, e.g., a floppy disk, a CD-ROM and IC card. As the storage medium 200 is installed into the storage device 24, the control program comprising the procedure codes is loaded to the RAM 13 and executed by the CPU 11.

The present invention can be applied to a system constituted by a plurality of devices or to an apparatus comprising a single device.

Furthermore, the invention is also applicable to a case where the invention is embodied by supplying a program to a system or apparatus. In this case, a storage medium, storing a program according to the invention, constitutes the invention. The system or apparatus installed with the program read from the medium realizes the functions according to the invention.

As described above, according to the present invention, an image process method and apparatus which divides image information into predetermined-sized partial images, and performs a designated image processing by partial image, with a small memory capacity, can be provided.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   determination means for detecting a capacity of a memory available for storing image data, and automatically determining a data size based on the detected memory capacity;
   storage means for storing partial image data into the memory, obtained from an original image, having the data size determined by said determination means;
   processing means for performing predetermined image processing on the partial image data stored in the memory and
   output means for outputting the partial image data processed by said processing means.

2. The image processing apparatus according to claim 1, further comprising control means for controlling said storage means, said processing means and said output means to repeat storing, execution of processing, and outputting so that the predetermined processing is performed with respect to all the original image.

3. The image processing apparatus according to claim 2, wherein during the repeated execution of processings by said execution means, said storage means stores the partial image data having an overlapped portion with a part of next partial image data, and wherein said output means outputs a partial image based on the partial image data except the overlapped portion.

4. The image processing apparatus according to claim 1, further comprising reading means for optically reading the original image and obtaining the partial image data having the data size determined by said determination means.

5. The image processing apparatus according to claim 4, further comprising execution means for repeatedly performing reading by reading means, storing by said storage means, execution of processing by said processing means and outputting by said output means, and updated means for updating a pointer, indicative of a start position for reading by said reading means, based on the data size determined by said determination means,
   wherein said reading means reads the partial image data having the data size determined by said determination means from a position indicated by the pointer.

6. The image processing apparatus according to claim 1, wherein said storage means sequentially inputs image data obtained by optically reading the original image, extracts the partial image data having the data size determined by said determination means, and stores the extracted partial image data.

7. The image processing apparatus according to claim 6, wherein said storage means counts the number of lines of the input image data, extracts the partial image data based on a count value, and stores the partial image data.

8. The image processing apparatus according to claim 7, further comprising execution means for repeatedly performing storing by said storage means, execution of processing by said processing means and outputting by said output means, and update means for, in repeated execution of processings by said execution means, updating a start line number and an end line number respectively indicative of a reading-start position and a reading-end position for reading the partial image data by said reading means, based on the data size determined by said determination means
   wherein said reading means counts the number of lines of the input image data, extracts image data between the start line number and the end line number, as the partial image data, and stores the extracted partial image data.

9. The image processing apparatus according to claim 1, further comprising designation means, having a plurality of image processings executable by said processing means, for designating desired one of the plurality of image processings,
   wherein said processing means performs the image processing designated by said designation means on the partial image data stored in said storage means.

10. The image processing apparatus according to claim 9, wherein the plurality of image processings contain at least one of masking, enlargement and/or reduction, mosaic processing, artistic-touch processing, optical-filter processing, fogging, edge enhancing, ripple-adding processing and twist-adding processing.

11. An image processing method comprising:
    a determination step of detecting a capacity of a memory available for storing image data, and automatically determining a data size based on the detected memory capacity;
    a storage step of storing partial image data into the memory, obtained from an original image, having the data size determined in said determination step;
    a processing step of performing predetermined image processing on the partial image data stored in the memory at said storage step; and
    an output step of outputting the partial image data processed at said processing step.

12. The image processing method according to claim 11, further comprising a control step of controlling said storage step, said processing step and said output step to repeat storing, execution of processing, and outputting so that the predetermined processing is performed with respect to all the original image.

13. The image processing method according to claim 12, wherein during the repeated execution of processings at said execution step, the partial image data having an overlapped portion with a part of next partial image data is stored at said storage step, and wherein at said output step, a partial image is outputted based on the partial image based on the partial image data except the overlapped portion.

14. The image processing method according to claim 11, further comprising a reading step of optically reading the original image and obtaining the partial image data having the data size determined at said determination step.

15. The image processing method according to claim 14, further comprising an execution step of repeatedly performing reading at said reading step storing at said storage step, execution of processing at said processing step and outputting at said output step, and an update step of updating a pointer, indicative of start position for reading at said reading step, based on the data size determined at said determination step, wherein at said reading step, the partial image data having the data size determined at said determination step is read from a position indicated by the pointer.

16. The image processing method according to claim 11, wherein at said storage step, image data obtained by optically reading the original image is sequentially inputted, the partial image data having the data size determined at said determination step is extracted, and the extracted partial image data is stored.

17. The image processing method according to claim 16, wherein at said storage step, the number of lines of the input image data is counted, the partial image data is extracted based on a count value, and the partial image data is stored.

18. The image processing method according to claim 17, further comprising an execution step of repeatedly performing storing at said storage step, execution of processing at said processing step and outputting at said output step, and an update step of, in repeated execution of processings at said execution step, updating a start line number and an end line number, respectively indicative of a reading-start position and a reading-end position for reading the partial image data at said reading step, based on the data size determined at said determination step, wherein at said reading step, the number of lines of the input image data is counted, image data between the start line number and the end line number is extracted, as the partial image data, and the extracted partial image data is stored.

19. The image processing method according to claim 11, further comprising a designation step of providing a plurality of image processings executable at said processing step, and designating desired one of the plurality of image processings, wherein at said processing step, the image processing designated at said designation step is performed on the partial image data stored at said storage step.

20. The image processing method according to claim 19, wherein the plurality of image processings contain at least one of masking, enlargement and/or reduction, mosaic processing, artistic-touch processing, optical-filter processing, fogging, edge enhancing, ripple-adding processing and twist-adding processing.

21. A computer program product comprising a computer usable medium having computer readable program code means embodied in said medium for image processing, said product comprising:

first computer readable program code means for executing a determination process for detecting a capacity of a memory available for storing image data, and automatically determining a data size based on the detected memory capacity;

second computer readable program code means for executing a storage process for storing partial image data into the memory, obtained from an original image, having the data size determined by said determination process;

third computer readable program code means for executing a processing process for performing predetermined image processing on the partial image data stored at said storage process; and fourth computer readable program code means for executing an output process for outputting the partial image data processed at said processing process.

22. The computer program product according to claim 21, further comprising fifth computer readable program code means for executing a control process for controlling said storage process, said processing process and said output process to repeat storing, execution of processing, and outputting so that the predetermined processing is performed with respect to all the original image.

23. The computer program product according to claim 21, further comprising sixth computer readable program code means for executing a designation process for providing a plurality of image processings executable at said processing process, for designating desired one of the plurality of image processings, wherein at said processing process, the image processing designated at said designation process is performed on the partial image data stored at said storage process.

* * * * *

UNITED STATES PATENT AND TRADEMARK OFFICE
CERTIFICATE OF CORRECTION

PATENT NO. : 5,758,043

DATED : May 26, 1998

INVENTOR(S) : MASASHI TAKIZAWA, ET AL.

It is certified that error appears in the above-identified patent and that said Letters Patent is hereby corrected as shown below:

COLUMN 3

Line 39, "reading." should read --reading--.

COLUMN 5

Line 47, "operation. Image" should read --operation, i.e., image--.

COLUMN 6

Line 15, "memory-3." should read --memory 3.--.

COLUMN 9

Line 42, "memory" should read --memory;--.

COLUMN 10

Line 26, "means" should read --means,--.

UNITED STATES PATENT AND TRADEMARK OFFICE
CERTIFICATE OF CORRECTION

PATENT NO. : 5,758,043

DATED : May 26, 1998

INVENTOR(S): MASASHI TAKIZAWA, ET AL.

It is certified that error appears in the above-identified patent and that said Letters Patent is hereby corrected as shown below:

COLUMN 11

Line 11, "step" should read --step,--.

Signed and Sealed this

Fifth Day of January, 1999

Attest:

Attesting Officer

*Acting Commissioner of Patents and Trademarks*